United States Patent Office 2,762,781
Patented Sept. 11, 1956

2,762,781

PLATINUM CATALYST

Kenzie Nozaki, El Cerrito, and Oliver Johnson, Berkeley, Calif., assignors to Shell Development Company, Emeryville, Calif., a corporation of Delaware No Drawing. Application October 19, 1953, Serial No. 387,057

2 Claims. (Cl. 252—433)

This invention relates to new and improved platinum catalyst.

Platinum, supported upon various carrier materials such as activated carbon, asbestos, silica gel, alumina and the like, has been used to catalyze a large number of different chemical reactions. Such catalysts are known to be particularly active in catalyzing the hydrogenation and dehydrogenation of hydrocarbons and various other organic compounds. In such hydrogenation-dehydrogenation reactions, the usual platinum catalyst acts in a relatively clean-cut manner, giving little isomerization of the reactant or product and this is often desirable. There are, however, other cases where isomerization activity accompanying the hydrogenation-dehydrogenation activity is desirable. One example of such a case is the catalytic dehydrogenation of naphthenic petroleum fractions. Thus, for example, if a naphthenic petroleum fraction is dehydrogenated with a conventional platinum catalyst, the $C_6$-ring naphthenes are substantially completely dehydrogenated to the corresponding aromatic hydrocarbons, whereas the naphthene for $C_5$-rings, such as methylcyclopentane, remain substantially unaffected. If, however, the platinum catalyst likewise possesses isomerization activity, the $C_5$-ring naphthenes are also largely converted to aromatic hydrocarbons, thereby greatly improving the result.

It is known that when the platinum is applied on a support material containing a suitable acidic component, the hydrogenation-dehydrogenation activity is considerably promoted and at the same time the catalyst acquires isomerization activity. The acidic component used is generally one of the halogens. Thus, for example, if a catalyst is prepared by impregnating a non-acidic support, such as pure silica gel with chloroplatinic acid or an ammonia complex thereof (chloroplatinic acid, sometimes called platinum tetrachloride, is the only soluble platinum salt commercially available) and then dried and calcined at 400° C., the chlorine introduced with the platinum is substantially completely lost upon calcination and reduction, and the resulting catalyst is substantially free of chlorine. When methylcyclopentane is treated under otherwise dehydrogenating conditions with such catalyst, it remains substantially unaffected. If, on the other hand, a catalyst is prepared in the same way with a support containing alumina, the chlorine introduced with the platinum remains tightly held, and due to the thus imparted acidity, the resulting catalyst exhibits pronounced isomerization and cracking activity and is capable of converting methylcyclopentane into benzene in substantial yields. In order to increase the acidity of the catalyst, additional halogen is sometimes added by first treating the alumina carrier with hydrochloric acid or hydrofluoric acid. The combination of a few tenths of a per cent of chlorine introduced with the chloroplatinic acid with a few tenths of a per cent of fluorine introduced by treating the alumina with a dilute solution of hydrofluoric acid results in an excellent catalyst for the reforming of petroleum naphthas and the production of aromatic hydrocarbons from naphthenic petroleum fractions. It may be also used for the isomerization of paraffin hydrocarbons.

While halogen is one of the preferred components in such platinum catalyst containing alumina, various other acidic components have been suggested. For instance, the group of solid catalysts, known as cracking catalysts, are acidic and may be used as supports for the platinum. The catalyst used commercially in catalytic cracking, for instance, is a synthetic composite of silica and alumina having a microporous structure and having, under normal conditions of use, an available surface between about 50 and 150 square meters per gram. Activated clays are also so used. These materials may be used as supports for the platinum. Other acidic substances which may be incorporated are, for instance, boric oxide, phosphoric acid, aluminum phosphate, aluminum fluoride and like materials previously shown to be cracking promoters.

While these various acidic components are all capable of promoting the hydrogenation-dehydrogenation activity of the platinum catalyst to the extent that only quite small amounts of platinum are required and are also capable of imparting to the catalyst a pronounced isomerization activity, some are much more effective than others.

It has now been found that the combination of aluminum fluoride ($AlF_3$) with aluminum borofluoride ($Al(BF_4)_3$) imparts to the catalyst a particularly high activity which is considerably greater than that obtained with the standard halogen promoters and that obtained with either of these agents alone. The large improvement afforded by the combination compared to that obtained with certain other acidic components is illustrated in the following examples. In these examples, a commercial catalyst of the general type promoted with halogens is used as a standard for comparison and is given an activity rating of 1.0 on the space velocity basis. In other words, the catalysts are rated in terms of the relative space velocities allowable to give equal conversions. All of the catalysts contained the same amount of platinum namely about 0.3%. All of the catalysts were prepared with an alumina carrier. The catalysts were all tested under the following standard test conditions for the conversion of methylcyclopentane (96% pure):

Temperature _____ 475° C.
Pressure _____ 300 p. s. i. g.
Hydrogen diluent _____ 5 moles per mole methylcyclopentane.

The results are shown in the following table:

| Catalyst | Acid Component | Concentration of Promoter | LHSV | Relative Activity | Conversion Efficiency |
|---|---|---|---|---|---|
| P-125 | $BPO_4$ | 1.0 | 5.9 | 0.5 | 77 |
| P-139 | $BPO_4+MgO$ | 1.0 | 5.9 | 0.4 | 75 |
| P-146 | $BPO_4+ZnF_2$ | 1.0 | 5.9 | 0.2 | 55 |
| P-123 | $Al(BF_4)_3$ | 0.32 | 8.7 | 1.3 | 78 |
| P-122 | $AlF_3$ | 0.32 | 8.7 | 3.3 | 82 |
| P-141 | $AlF_3+Al(BF_4)_3$ | 0.16 each | 8.7 | 20 | 80 |

In the preceding table, the first column gives the catalyst reference number. Column 2 indicates the promoter used. Column 3 shows the concentration of the promoter in terms of moles per kg. of catalyst. Column 4 shows the through-put rates in terms of liquid hour space velocity (LHSV). Column 5 shows the activity of the catalyst relative to the standard catalyst which is rated at 1.0. The last column shows the conversion efficiency which is the per cent of the converted methylcyclopentane which is converted to the desired product, namely, benzene. In all catalysts except the standard catalyst the platinum was incorporated through the use of tetraammine platinous hydroxide, thereby avoiding promotion of the catalyst with the chloride normally introduced in alumina base catalysts when chloroplatinic acid is used. This is not essential to the invention but is necessary in order to allow a valid comparison.

Referring to the above table, it will be noted that boron phosphate, even when incorporated in relatively large amounts, gives a catalyst having only about half the activity of the standard catalyst. The addition of magnesium oxide resulted in lowering the relative activity to 0.4, and the addition of zinc fluoride lowered the relative activity to 0.2. Aluminum borofluoride in a concentration of 0.32 mole per kg. gave a catalyst having a relative activity of 1.3 and aluminum fluoride in the same concentration gave a catalyst having a relative activity of 3.3, which is quite good. However, when aluminum fluoride and aluminum borofluoride were used together in the same total amount (0.16 mole each per kg.), it is seen that the resulting catalyst had a relative activity of over twenty times the standard catalyst. In other words, only one-twentieth as much catalyst is required to effect the conversion or, using the same amount of catalyst, the through-put rate may be twenty times as great.

The catalyst P-122 was prepared as follows: A small amount of freshly prepared alumina hydrogel was dissolved in sufficient of a 4.8% solution of hydrofluoric acid to give the calculated amount of aluminum fluoride. The resulting solution was combined with the calculated amount of alumina hydrogel; then sufficient tetraammine platinous hydroxide solution was incorporated to give 0.3% platinum on the finished catalyst. The resulting composite gel was dried at 120° C. and then treated with hydrogen at 475° C. prior to use.

The catalyst P-123 was prepared by first preparing a solution containing the calculated amount of aluminum borofluoride by dissolving a small quantity of alumina hydrogel in the calculated amount of 12% fluoboric acid. The solution of the aluminum fluoborate was then incorporated in the alumina hydrogel, the platinum was incorporated, and the catalyst was finished as above described.

Catalyst P-141 was prepared in the same manner as catalysts P-122 and P-123 except that the indicated amounts of the aluminum fluoride and aluminum borofluoride were incorporated in the alumina hydrogen.

The amount of acidic components to be incorporated is preferably adjusted as is the practice with other acidic promoters in accordance with the concentration of platinum and the intended use of the catalyst, and may vary considerably. In general, the concentration of aluminum fluoride and the aluminum borofluoride are each at least 0.03 mole per kilogram of the catalyst and may be considerably higher, e. g., up to about 0.4 mole. While it is not desired to be bound by the correctness of any theories or explanations, it is believed that the synergisitic effect of the two mentioned promoters, when used in combination, is due to a mutual inhibition or influence of or on the crystal growth of the respective compounds. The aluminum fluoride and aluminum borofluoride may be used in equal or unequal molecular proportions.

The platinum and the said combination of acidic components may be applied to other support materials, such as, for instance, silica gel, activated carbons, diatomaceous earth, magnesium sulfate, asbestos, Vicor glass, microporous zirconia gel, activated bauxite, and the like. They may be incorporated in such supports by known means such that they are evenly distributed throughout the body of the catalyst particles, or they may be applied predominantly on the macrosurface of the particles. The catalyst of the invention, in view of its exceptionally high activity, is superior for some purposes when of this latter type, e. g., when the reaction takes place at such a rapid rate that the interior surface of the micropores is essentially unused and, if used, leads mainly to side reactions. In these cases, it will be noted that the activity of the catalyst increases rapidly with decrease in the average particle size of the catalyst. Thus, the activity of the above catalysts which were used in the form 16 to 40 mesh particles is considerably increased for such reactions merely by breaking the particles up into particles of smaller size. For this reason, the catalysts of the invention are particularly suited for use in powdered form, using the so-called fluidized catalyst technique.

In cases where it is desired to effect the most efficient conversion of two reactants, only one of which requires isomerization, e. g., the simultaneous conversion of $C_6$-ring naphthenes and $C_5$-ring naphthenes, it is often advantageous to apply the acidic components uniformly distributed throughout the catalyst particles or predominantly near the center of the particles, and to incorporate the platinum mainly near the macrosurface. The concentration of the acidity near the center may be effected either by partially removing the acidic components near the macrosurface of relatively homogeneous particles or by partially neutralizing the outer surface of the catalyst particles with an alkaline-acting material. Components of the strongly electropositive elements, such as Ca, Mg, Ba, Zn, Li, Na, and K effect such poisoning either by an alkaline nature or by reverting to alkaline-acting material, e. g., the oxides, in the catalyst during use. Thus, as shown, even zinc fluoride exerts a distinct poisoning effect probably by transferring the fluoride and reverting to the mildly basic oxide. The reason for preferring this uneven distribution of the platinum and acidic components is that the straight hydrogenation-dehydrogenation reaction normally takes place at a considerably faster rate than the reaction involving isomerization. The hydrogenation-dehydrogenation therefore tends to take place predominantly in the outer layers of the catalyst particles, whereas the isomerization reaction, being slower, takes place largely in the interior micropores. In such cases, where isomerization is not involved and only the promoting action of the acidic component is desired, the platinum and acidic component may be applied on the surface of relatively non-porous carriers such as the porcelain, metals, asbestos, and the like. Such catalysts are preferred for effecting reactions which take place at a very fast rate, e. g., the dehydrogenation of olefins to diolefins at high temperatures, certain oxidation reactions, and the like.

The platinum content of the catalyst may range from about 0.05% up to about 1% but will generally be below about 0.5%. In view of the very high activity, platinum concentrations in a very low range corresponding to about 0.5 to 1.5 grams per liter may be used.

The improved catalysts just described are improved catalysts of the known type rather than a new type of catalyst. They may be employed in place of the known catalyst in any case where the previously known platinum catalysts having isomerization activity are applicable. One application of immediate interest is in processes in which the dehydro-isomerization of alkyl-substituted $C_5$-ring naphthenes to the corresponding aromatic hydrocarbons is involved. The aromatization and hydroforming of gasolines and naphthas are typical examples of such processes.

We claim as our invention:

1. A catalyst consisting essentially of a relatively inert carrier in which is incorporated from 0.05 to 1% platinum with from 0.03 to 0.4 mole per kilogram each of aluminum fluoride and aluminum borofluoride as acidic promoters.

2. A catalyst having isomerization activity as well as dehydrogenation activity consisting essentially of a relatively inert carrier promoted with about 0.05 to 1% platinum and about 0.16 moles each of aluminum fluoride and aluminum borofluoride per kilogram of catalyst.

References Cited in the file of this patent

UNITED STATES PATENTS

| | | |
|---|---|---|
| 2,479,109 | Haensel | Aug. 16, 1949 |
| 2,625,504 | Haensel | Jan. 13, 1953 |